(12) United States Patent
Matsuda et al.

(10) Patent No.: US 8,445,572 B2
(45) Date of Patent: May 21, 2013

(54) RUBBER COMPOSITION

(75) Inventors: Takashi Matsuda, Hiratsuka (JP); Wonmun Choi, Hiratsuka (JP); Satoshi Mihara, Hiratsuka (JP); Naoki Kushida, Hiratsuka (JP); Takashi Kakubo, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 313 days.

(21) Appl. No.: 12/669,885

(22) PCT Filed: Jul. 18, 2008

(86) PCT No.: PCT/JP2008/063470
§ 371 (c)(1),
(2), (4) Date: Mar. 31, 2010

(87) PCT Pub. No.: WO2009/014234
PCT Pub. Date: Jan. 29, 2009

(65) Prior Publication Data
US 2010/0222478 A1    Sep. 2, 2010

(30) Foreign Application Priority Data

Jul. 20, 2007  (JP) ................................. 2007-189792
Jul. 20, 2007  (JP) ................................. 2007-189810

(51) Int. Cl.
*C08K 5/17*  (2006.01)
*C08K 5/16*  (2006.01)

(52) U.S. Cl.
USPC .......................................... 524/238; 524/186

(58) Field of Classification Search
USPC .......................................................... 524/238
See application file for complete search history.

(56) References Cited

U.S. PATENT DOCUMENTS

| 5,004,787 | A | * | 4/1991 | Tojo et al. ................... 525/332.1 |
| 6,080,809 | A | * | 6/2000 | Stuhldreher ................... 524/447 |
| 2003/0199669 | A1 | * | 10/2003 | Saito et al. ..................... 528/393 |
| 2007/0032593 | A1 | * | 2/2007 | Yagi et al. ................... 524/575.5 |

FOREIGN PATENT DOCUMENTS

| JP | 63-289050 | | 11/1988 |
| JP | 2003-026864 | | 1/2003 |
| JP | 2003026864 A | * | 1/2003 |
| JP | 2003-138077 | | 5/2003 |
| JP | 2003138077 A | * | 5/2003 |
| JP | 2006131683 A | * | 5/2006 |

OTHER PUBLICATIONS

Translation of JP2003026864, Jan. 2003.*
Translation of JP2003138077, May 2003.*
Translation of JP 2006-131683, May 2006.*

* cited by examiner

*Primary Examiner* — Hui Chin
(74) *Attorney, Agent, or Firm* — Thorpe North & Western LLP

(57) ABSTRACT

Disclosed is a rubber composition containing (A) a natural rubber, a diene synthetic rubber or a combination of them and (B) 50-120 parts by weight of a silicic acid-based or silicate-based inorganic filler per 100 parts by weight of the component (A). This rubber composition is characterized by further containing (C) 0.2-20 parts by weight of a certain amine salt per 100 parts by weight of the component (A).

19 Claims, No Drawings

RUBBER COMPOSITION

TECHNICAL FIELD

The present invention relates to a rubber composition having superior workability, vulcanization characteristics, and viscoelastic characteristics, and to a pneumatic tire using the same.

BACKGROUND TECHNOLOGY

Although adding silica to rubber compositions as a reinforcing filler is known, generally, silica has a tendency to aggregate due to the formation of hydrogen bonds with silanol groups present on the surface of the particles thereof. Accordingly, there is a disadvantage in that kneading time normally needs to be long in order to satisfactorily disperse the silica in the rubber component. Also, when the dispersion of silica in the rubber component is insufficient, there is a disadvantage in that the Mooney viscosity of the obtained rubber composition increases, resulting in insufficient workability. Furthermore, since basic substances normally used as vulcanization accelerators are adsorbed by the surface of the silica particles due to their being acidic, there is a disadvantage in that control of the vulcanization process of the rubber composition and control of physical properties, especially viscoelastic characteristics, of the obtained vulcanized rubber becomes difficult. With respect to improving vulcanization characteristics, for example, Japanese Patent Publication (A) No. 2003-138077 suggests increasing cross-linking efficiency by adding a specific carboxylic acid amine salt as a vulcanization accelerator to a halogen-based saturated rubber. Also, with respect to improving workability and viscoelastic characteristics after vulcanization, for example, Japanese Patent Publication (A) No. 2003-176378 suggests adding, as a vulcanization accelerator, a compound having one or more each of an amine group and a group derived from an unsaturated carboxylic acid to natural rubber and/or a diene based synthetic rubber. However, these conventional techniques cannot improve all of the silica dispersibility (that is, workability of the rubber composition), vulcanization characteristics of the rubber composition, and viscoelastic characteristics of the rubber composition after vulcanization in good balance in a rubber composition including natural rubber and/or a diene-based synthetic rubber. Accordingly, high-dimensional and well-balanced improvement of these characteristics is desired.

DISCLOSURE OF INVENTION

Problems to be Solved by the Invention

Accordingly, an object of the present invention is to provide a rubber composition having superior workability, vulcanization characteristics, and viscoelastic characteristics.

SUMMARY OF THE INVENTION

The present inventors, as a result of diligent study to improve the above-mentioned problems, have found that an amine salt represented by the following general formula (I):

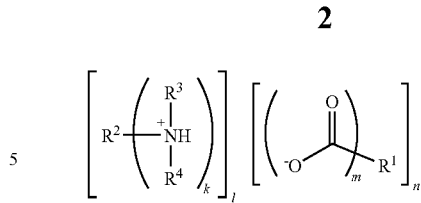

(wherein $R^1$ represents a saturated or unsaturated organic group of 1 to 12 carbons not having a hydroxyl group, or a saturated or unsaturated organic group of 1 to 12 carbons having 1 or more hydroxyl groups; and $R^2$, $R^3$, and $R^4$ each independently represent a hydrogen atom, a saturated or unsaturated chain hydrocarbon group of 1 to 12 carbons, a saturated or unsaturated alicyclic hydrocarbon group of 3 to 12 carbons, an aromatic hydrocarbon group of 6 to 18 carbons, a or heterocyclic group of 5 to 18 ring atoms and 2 or more carbons or at least two of $R^2$, $R^3$, and $R^4$ join together with the nitrogen atoms to which they are bonded to form a heterocyclic group of 5 to 18 ring atoms and 2 or more carbons;

k, l, and n are each an integer of 1 or more and m is an integer of 2 or more, with the proviso that k, l, m, and n satisfy the relational expression k×l=m×n=2 or more)

improves the workability, vulcanization characteristics and viscoelastic characteristics of a rubber composition including natural rubber and/or a diene-based synthetic rubber, thus completing the present invention.

BEST MODE FOR CARRYING OUT THE INVENTION

In the rubber composition of the present invention, natural rubber (NR), a diene-based synthetic rubber, or a combination thereof (component (A)) is used as the rubber component. As examples of the diene-based synthetic rubber, butadiene rubber (BR), isoprene rubber (IR), chloroprene rubber (CR), styrene-butadiene copolymer rubber (SBR), ethylene-propylene-diene copolymer rubber (EPDM), acrylonitrile-butadiene copolymer rubber (NBR) and the like may be mentioned. When natural rubber and the diene-based synthetic rubber are combined and used, the blending ratio of the natural rubber and diene-based synthetic rubber is arbitrary.

As examples of the silicic acid-based or silicate-based inorganic filler (component (B)) used in the rubber composition of the present invention, talc, kaolin, clay, silica stone powder mica, wollastonite, xonotlite, diatomite, synthetic wet silica, synthetic dry silica, synthetic calcium silicate, amorphous calcium silicate, attapulgite, sericite, zeolite, bentonite, pyrophyllite, zircon silicate, and the like may be mentioned. The inorganic filler (B) is preferably substantially formed from anhydrous silicic acid or hydrous silicic acid. The blended amount of the inorganic filler (B) is 50 to 120 parts by weight and preferably 60 to 100 parts by weight per 100 parts by weight of the component (A).

In order to increase dispersibility of the inorganic filler (B) in the component (A), 1 to 20% percent by weight of a silane coupling agent is added with respect to the total weight of the inorganic filler (B).

As specific examples of $R^1$ in general formula (I) of the amine salt (component (C)) used in the rubber composition of the present invention, saturated or unsaturated chain hydrocarbon groups of 1 to 12 carbons, for example, alkylene, alkenylene, and alkynylene groups such as a methylene group, an ethylene group, a trimethylene group, a tetramethylene group, a pentamethylene group, a hexamethylene group, a heptamethylene group, an octamethylene group, a nonamethylene group, a decamethylene group, an undecamethylene group, a dodecamethylene group, a propylene group, a vinylene group, a propenylene group, a —CH=CH—(CH$_2$)$_8$— group, an ethenylene group, a —CH≡CH—CH$_2$— group, a 1,2,3-triylpropane group and the like; saturated or unsaturated hetero atom-containing chain hydrocarbon groups of 1 to 12 carbons such as —CH$_2$—O—CH$_2$—, —CH$_2$—S—CH$_2$—, (—CH$_2$—)$_2$N(—CH$_2$)$_2$—N(—CH$_2$—)$_2$, (—CH$_2$—)$_2$N—(CH$_2$)$_2$—N(—CH$_2$—)—(CH$_2$)$_2$—N(—CH$_2$—)$_2$, (—CH$_2$—)$_2$N—(CH$_2$)$_2$—N(—CH$_2$—)—(CH$_2$)$_2$—N(—CH$_2$—)—(CH$_2$)$_2$—N(—CH$_2$—)$_2$, —CH$_2$CH$_2$—CH—N(CH$_2$)$_2$—, and the like; saturated or unsaturated alicyclic hydrocarbons group of 3 to 12 carbons such as a cyclopropylidene group, a cyclopropylene group, a cyclobutylene group, a cyclopentylene group, a cyclohexylene group, a cyclohexenylene group, a cyclooctylene group, 1-methyl-4-cyclohexenylene group, a norbornylene group, or the like; aromatic hydrocarbon groups of 6 to 12 carbons, for example, aryl, aryl alkyl, aryl alkenyl, alkyl aryl, or alkenyl aryl groups such as an o-phenylene group, an m-phenylene group, a p-phenylene group, a 4-methyl-m-phenylene group, a cyclooctatetraenylene group, a 1,2-naphthalenylene group, a 1,3-naphthalenylene group, and 1,8-naphthalenylene group, a naphthalenetriyl group, a biphenylenediyl group, a biphenyldiyl group, a C$_6$H$_5$—CH$_2$—CH— group, a —CH$_2$—C$_6$H$_4$—CH$_2$— group and the like; a heterocyclic group of 5 to 18 ring atoms and 2 or more carbons such as a furandiyl group, a thiophenediyl group, a pyrrolediyl group, an oxazolediyl group, an isooxazolediyl group, a thiazolediyl group, and isothiazolediyl group, an imidazolediyl group, a pyrazolediyl group, a triazolediyl group, a pyridinediyl group, a pyrimidinediyl group, a pyridazinediyl group, a piperidinediyl group, a piperazinediyl group, a morpholinediyl group, an indolediyl group, an isoindolediyl group, a benzofurandiyl group, a benzothiophenediyl group, a quinolinediyl group, an acridinediyl group, and the like; and hydroxy-substituted derivatives that are hydroxy-substituted derivatives of these groups and that have 1 or more hydroxyl groups, for example saturated or unsaturated chain hydrocarbon groups of 1 to 12 carbons having 1 or more hydroxyl groups such as a hydroxymethylene group (—CH(OH)—), a 1-hydroxyethylene group (—CH$_2$—CH(OH)—), a 1,2-dihydroxyethylene group (—CH(OH)—CH(OH)—), a 2-hydroxypropylene group (—CH(OH)—C(OH)—CH$_2$—), a 1-hydroxypropylene group (—CH$_2$—CH—CH(OH)—), and the like; aromatic hydrocarbon groups of 6 to 12 carbons having 1 or more hydroxyl groups such as a mono- or dihydroxy-substituted phenylene group and the like may be mentioned.

The above-mentioned saturated or unsaturated chain hydrocarbon groups of 1 to 12 carbons and saturated or unsaturated hetero atom-containing chain hydrocarbon groups of 1 to 12 carbons can be a straight chain or a branched chain. Concerning the above-mentioned saturated or unsaturated alicyclic hydrocarbon groups of 3 to 12 carbons, aromatic hydrocarbon groups of 6 to 12 carbons, and the heterocyclic group of 5 to 18 ring atoms and 2 or more carbons, when a substituent is present on the carbon ring or the hetero ring, the above-mentioned number of carbons means the total number of carbons including the number of carbons of the substituent.

Preferably, $R^1$ is selected from saturated or unsaturated chain hydrocarbon groups of 1 to 12 carbons, aromatic hydrocarbon groups of 6 to 12 carbons, and hydroxy-substituted derivatives that are hydroxy-substituted derivatives of these groups and that have 1 or more hydroxyl groups. More preferably, $R^1$ is selected from saturated or unsaturated chain hydrocarbon groups of 2 to 4 carbons, o-, m-, and p-phenylene groups, and hydroxy-substituted derivatives that are hydroxy-substituted derivatives of these groups and that have 1 or more hydroxyl groups, for example, an ethylene group, a trimethylene group, a tetramethylene group, a 1,2,3-triylpropane (—CH$_2$—CH—CH$_2$—), a vinylene group, an o-phenylene group, a 1-hydroxyethylene group (—CH$_2$—CH(OH)—), a 1,2-dihydroxyethylene group, —CH(OH)—CH(OH)—), or a 1,2,3-triyl-2-hydroxypropane group (—CH$_2$—C(OH)—CH$_2$—).

When $R^1$ is a saturated or unsaturated hetero atom-containing chain hydrocarbon group of 1 to 12 carbons, as examples of the hetero atom included in the hetero atom-containing chain hydrocarbon group, nitrogen, oxygen and sulfur atoms may be mentioned. When the hetero atom is selected from nitrogen, oxygen and sulfur atoms, the nitrogen, oxygen and sulfur atoms can be included in the carbon chain of the above-mentioned hetero atom-containing chain hydrocarbon group as groups such as amino groups, ether groups, thioether groups, and the like.

As specific examples of $R^2$, $R^3$, and $R^4$ in general formula (I) of the amino salt (component (C)) used in the rubber composition of the present invention, hydrogen atoms, saturated or unsaturated chain hydrocarbon groups of 1 to 12 carbons, for example, alkyl, alkenyl, and alkynyl groups such as methyl groups, ethyl groups, propyl groups, isopropyl groups, butyl groups, isobutyl groups, sec-butyl groups, tert-butyl groups, pentyl groups, isopentyl groups, neopentyl groups, tert-pentyl groups, hexyl groups, isohexyl groups, ethylhexyl groups, heptyl groups, octyl groups, nonyl groups, decyl groups, undecyl groups, dodecyl groups, vinyl groups, allyl groups, isopropenyl groups, —CH=CH—(CH$_2$)$_8$— groups, ethynyl groups, and the like; saturated or unsaturated alicyclic hydrocarbon groups of 3 to 12 carbons such as cyclopropyl groups, cyclopropenyl groups, cyclobutyl groups, cyclopentyl groups, cyclohexyl groups, cyclohexenyl groups, cycloheptyl groups, cyclooctyl groups, adamantanyl groups, and the like; and aromatic hydrocarbon groups of 6 to 18 carbons, for example, aryl groups such as phenyl groups, naphthyl groups, biphenylenyl groups, fluorenyl groups, anthryl groups, and the like, aryl alkyl groups such as benzyl groups, phenylethyl groups, and the like, aryl alkenyl groups such as styryl groups, cinnamyl groups, and the like, alkyl aryl groups such o-, m-, or p-methylphenyl groups, 2,3-, 2,4-, 2,5-, 2,6-, 3,4-, or 3,5-dimethylphenyl groups, 2,4,5- or 2,4,6-trimethylphenyl groups, 2,3,4,5-, 2,3,4,6-, or 2,3,5,6-tetramethylphenyl groups, 3-, 4-, 5-, or 6-ethyl-2-hexylphenyl groups, 2-, 4-, or 5-ethyl-3-hexylphenyl groups, 2- or 3-ethyl-4-hexylphenyl groups, 2- or 3-ethyl-5-hexylphenyl groups, 2-ethyl-6-hexylphenyl groups, and the like, alkenyl aryls such as styryl groups, and alkoxy-substituted derivatives of aryl, aryl alkyl, aryl alkenyl, alkyl aryl, and alkenyl aryl groups, for example, 2-, 3-, or 4-methoxyphenyl groups, 2-, 3-, or 4-ethoxyphenyl groups, 2-, or 4-methoxy-3-methylphenyl groups, 2- or 3-methoxy-4-methylphenyl groups, 2- or 3-methoxy-5-methylphenyl groups, or 3-methoxy-6-methylphenyl groups, 3-, or 4-methoxy-2-methylphenyl groups, 2- or 4-methoxy-3-ethylphenyl groups, 2- or 3-methoxy-4-ethylphenyl groups, 2-, 3-, or 4-methoxy-5-ethylphenyl groups, 2-, 3-, or 4-methoxy-6-ethylphenyl groups, or 4-methoxy-2-ethylphenyl groups, 2-methoxy-3,4,5-trimethylphenyl groups, 3-methoxy-2,4,5-trimethylphenyl groups, 4-methoxy-2,3,5-trimethylphenyl groups, and the like; and heterocyclic groups of 5 to 18 ring atoms and 2 or more carbons, for example, furanyl groups, thienyl groups, pyrrolyl groups, oxazolyl groups, isooxazolyl groups, thiazolyl groups, isothiazolyl groups, imidazolyl groups, pyrazolyl groups, triazolyl groups, pyridinyl groups, pyrimidinyl groups, pyridazinyl groups, piperidinyl groups, piperazinyl groups, morpholinyl groups, indolyl groups, isoindolyl groups, benzofuranyl groups, benzothienyl groups, quinolinyl groups, acridinyl groups, 2-(3,4-dihydroxyphenyl)ethylene groups, 2-(3,4-dihydroxyphenyl)-2-hydroxyethyl groups, and the like may be mentioned.

The above-mentioned saturated or unsaturated chain hydrocarbon groups of 1 to 12 carbons can be a straight chain or a branched chain. Also, concerning the above-mentioned saturated or unsaturated alicyclic hydrocarbon groups of 3 to 12 carbons, aromatic hydrocarbon groups of 6 to 18 carbons, and heterocyclic groups of 5 to 18 ring atoms and 2 or more carbons, when a substituent is present on the carbon ring or the hetero ring, the above-mentioned number of carbons means the total number of carbons including the number of carbons of such substituent.

At least two among $R^2$, $R^3$, and $R^4$ join together with the nitrogen atoms to which they are bonded to form a heterocyclic group of 5 to 18 hetero atoms and 2 or more carbons, for example, furanyl groups, thienyl groups, pyrrolyl groups, oxazolyl groups, isooxazolyl groups, thiazolyl groups, isothiazolyl groups, imidazolyl groups, pyrazolyl groups, triazolyl groups, pyridinyl groups, pyrimidinyl groups, pyridazinyl groups, piperidinyl groups, piperazinyl groups, morpholinyl groups, indolyl groups, isoindolyl groups, benzofuranyl groups, benzothienyl groups, quinolinyl groups, acridinyl groups, and the like.

Preferably, $R^2$, $R^3$, and $R^4$ are each independently selected from saturated or unsaturated chain hydrocarbon groups of 4 to 6 carbons, saturated or unsaturated alicyclic hydrocarbon groups of 6 carbons, and aromatic hydrocarbon groups of 6 to 8 carbons.

With respect to k, l, and m in general formula (I), preferably, k=1, l=2, m=2, and n=1 or k=1, l=3, m=3, and n=1.

The blended amount of the amine salt (C) in the rubber composition of the present invention is 0.2 to 20 parts by weight and preferably 0.5 to 8 parts by weight based on 100 parts by weight of the component (A).

The above-mentioned amine salt is obtained by reacting n moles of a polycarboxylic acid represented by the following general formula (II):

$$R^1-(COOH)_m \quad (II)$$

and 1 mole of an amine represented by the following general formula (III):

$$R^2-(NR^3R^4)_k \quad (III)$$

in a solvent. Here, $R^1$, $R^2$, $R^3$, and $R^4$ are as previously defined. k, l, and m are each integers of 1 or more and m is an integer of 2 or more, with the proviso that k, l, m, and n satisfy the relational expression k×l=m×n=2 or more.

As specific examples of the polycarboxylic acid of the above-mentioned general formula (II) used as a starting material in this production method, for example, the saturated or unsaturated chain hydrocarbon groups, hetero atom-containing chain hydrocarbon groups, alicyclic hydrocarbon groups, aromatic hydrocarbon groups, heterocyclic groups, and hydroxy-substituted derivatives which are hydroxy-substituted derivatives of these groups and which have 1 or more hydroxyl groups disclosed as specific examples of $R^1$ in general formula (I) may be mentioned. For example, saturated or unsaturated aliphatic or alicyclic polycarboxylic acids of 3 to 14 carbons, for example, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, methylsuccinic acid, maleic acid, fumaric acid, acetylenecarboxylic acid, glutaconic acid, 2-dodecenedioic acid, cyclopropane-1,1-dicarboxylic acid, cyclopropane-1,2-dicarboxylic acid, cis-cyclobutane-1,2-dicarboxylic acid, cyclopentane-1,3-dicarboxylic acid, cyclohexane-1,2-dicarboxylic acid, cyclohexane-1,3-dicarboxylic acid, cyclohexane-1,4-dicarboxylic acid, cyclohexene-1,2-dicarboxylic acid, cyclooctane-1,2-dicarboxylic acid, cyclooctane-1,3-dicarboxylic acid, cyclooctane-1,4-dicarboxylic acid, cyclooctane-1,5-dicarboxylic acid, 1-methyl-4-cyclohexene-1,2-dicarboxylic acid, 2-norbornene-2,3-dicarboxylic acid, 1,2,3-propanetricarboxylic acid, and the like; saturated or unsaturated hetero atom-containing aliphatic carboxylic acids of 3 to 14 carbons, for example, oxydiacetic acid, thiodiacetic acid, nitrilotriacetoacetic acid, ethylenediaminetetraacetic acid, diethylenetriaminepentaacetic acid, triethylenetetraminepentaacetic acid, dicarboxymethylglutamic acid, and the like; aromatic carboxylic acids of 8 to 14 carbons, for example, phthalic acid, isophthalic acid, terephthalic acid, phenylmalonic acid, phenylenediacetic acid, phenylsuccinic acid, 1,3,5,7-cyclooctatetraene-1,2-dicarboxylic acid, 1,2-naphthalenedicarboxylic acid, 1,3-naphthalenedicarboxylic acid, 1,8-naphthalenedicarboxylic acid, 1,3,5-naptholenetricarboxylic acid, phenylmalonic acid, benzylmalonic acid, phenylenediacetic acid, phenylsuccinic acid, and the like; heterocyclic carboxylic acids of 5 to 14 carbons, for example, 1,2,3-triazole-4,5-dicarboxylic acid, 2,2'-bipyridine-3,3'-dicarboxylic acid, 2,2-bipyridine-4,4-dicarboxylic acid, 2,5-dihydro-3,4-furandicarboxylic acid, and the like; and hydroxyl-substituted polycarboxylic acids which are hydroxyl-substituted polycarboxylic acids of the above-mentioned aliphatic or alicyclic polycarboxylic acids, hetero atom-containing aliphatic polycarboxylic acids, aromatic polycarboxylic acids, and heterocylic polycarboxylic acids and that have 1 or more hydroxyl groups, for example, tartronic acid, malic acid, tartaric acid, citric acid, isocitric acid, 5-hydroxyisophthalic acid, and the like may be mentioned.

Preferably, the polycarboxylic acid of the above-mentioned formula (II) is selected from saturated or unsaturated chain hydrocarbon groups of 1 to 12 carbons, aromatic hydrocarbon groups of 6 to 12 carbons, and hydroxy-substituted derivatives that are hydroxy-substituted derivatives of these groups and that have 1 or more hydroxyl groups as the $R^1$ group. More preferably, the polycarboxylic acid of the above-mentioned formula (II) is selected from saturated or unsaturated chain hydrocarbon groups of 2 to 4 carbons; o-, m-, and p-phenylene groups; and hydroxy-substituted derivatives which are hydroxy-substituted derivatives of these groups and that have 1 or more hydroxyl groups as the $R^1$ group. As examples of such polycarboxylic acids, succinic acid, glutaric acid, adipic acid, malic acid, tartaric acid, citric acid, isocitric acid, phthalic acid, isophthalic acid, terphthalic acid, 5-hydroxyisophthalic acid, and the like may be mentioned.

The amine of above-mentioned formula (III) used as a starting material of the amine salt of the present invention can be a primary, secondary, or tertiary amine. As specific examples of primary amines, primary amines having 1 group selected from saturated or unsaturated chain hydrocarbon groups, alicyclic hydrocarbon groups, aromatic hydrocarbon groups, and heterocyclic groups disclosed as specific examples of $R^2$, $R^3$, and $R^4$ in general formula (I) as an N-substituent, for example, methylamine, ethylamine, propylamine, isopropylamine, butylamine, sec-butylamine, tert-butylamine, pentylamine, hexylamine, 2-ethylhexylamine, heptylamine, octylamine, nonylamine, decyamine, undecylamine, dodecylamine, ethylenediamine, hexamethylenediamine, methoxyamine, cyclopropylamine, cyclobutylamine, cyclopentylamine, cyclohexylamine, cycloheptylamine, cyclooctylamine, amantadine, aniline, benzylamine, phenylethylamine, 2-,3- or 4-aminotolene, 2,3-, 2,4-, 2,5-, 2,6-, 3,4-, or 3,5-dimethylaniline, 2,4,5- or 2,4,6-trimethylaniline, 2,3,4,5-, 2,3,5,6- or 2,3,4,6-tetramethylaniline, 2-, 3-, or 4-methoxyaniline, 2-, 3-, or 4-ethoxyaniline, 2- or 4-methoxy-3-methylaniline, 2- or 3-methoxy-4-methylaniline, 2-, 3-, or 4-methoxy-5-methylaniline, 2- or 3-methoxy-6-methylaniline, 3- or 4-methoxy-2-methylaniline, 2- or 4-methoxy-3-ethylaniline, 2- or 3-methoxy-4-ethylaniline, 2-, 3-, or 4-methoxy-5-ethylaniline, 2-, 3-, or 4-methoxy-6-ethylaniline, 3- or 4-methoxy-2-ethylaniline, 2-methoxy-3,4,5-trimethylaniline, 3-methoxy-2,4,5-trimethylaniline, 4-methoxy-2,3,5-trimethylaniline, dopamine, and the like may be mentioned.

As specific examples of secondary amines, secondary amines having two groups selected from saturated or unsaturated chain hydrocarbon groups, alicyclic hydrocarbon groups, aromatic hydrocarbon groups, and heterocyclic groups disclosed as specific examples of $R^2$, $R^3$, and $R^4$ in general formula (I) as N-substituents, for example, dimethylamine, diethylamine, dipropylamine, diallylamine, diallylamine, N,N'-dimethylethylenediamine, N-methylcyclohexylamine, N-ethylcyclohexylamine, N,N-dicyclohexylamine, N-methylaniline, N-cyclohexylaniline, N-allylaniline, diphenylamine, 4,4-dimethyldiphenylamine, N-methyl-N-benzylamine, N-ethyl-N-benzylamine, N-cyclohexyl-N-benzylamine, N-cyclohexylaniline, and the like may be mentioned.

As specific examples of tertiary amines, tertiary amines having three groups selected from saturated or unsaturated chain hydrocarbon groups, alicyclic hydrocarbon groups, aromatic hydrocarbon groups, and heterocyclic groups disclosed as specific examples of $R^2$, $R^3$, and $R^4$ in general formula (I) as N-substituents, for example, trimethylamine, triethylamine, tetramethylethyleneamine, N,N-diisopropylethylamine, N,N-dimethylcyclohexylamine, N-methyl-dicyclohexylamine, tricyclohexylamine, N,N-dimethylaniline, N,N-dimethyl-1-naphthylamine, 1,8-bis(dimethylamino)-naphthalene, 4-(dimethylamino)pyridine, N,N-dimethylbenzylamine, N,N-diethylbenzylamine, N-benzyl-N-ethylaniline, N,N-dibenzylmethylaniline, tribenzylamine, and the like may be mentioned.

Preferably, the amine of the above-mentioned general formula (III) is selected from amines having saturated or unsaturated chain hydrocarbons of 4 to 6 carbons, saturated or unsaturated alicyclic hydrocarbons of 6 carbons, and aromatic hydrocarbons of 6 to 8 carbons as $R^2$, $R^3$, and $R^4$. More preferably, the amine of the above-mentioned general formula (III) is a mono- or di-primary amine having 1 or 2 amine groups per 1 molecule. As examples of preferable amines, tert-butylamine, hexamethyleneamine, cyclohexylamine, and phenylethylamine may be mentioned.

The above-mentioned amine salt (C) can be synthesized by reacting the polycarboxylic acid of general formula (II) and the amine of general formula (III) in the presence of, or not in the presence of, a solvent. When the amine salt (C) is synthesized in the presence of a solvent, this reaction temperature can be determined considering the volatility and stability of the used solvent, polycarboxylic acid, and amine, and the solubility of the polycarboxylic acid and amine in the solvent. When the amine salt (C) is synthesized without a solvent, the reaction temperature can be determined considering the mutual solubility between the polycarboxylic acid and amine.

The solvent used in the synthesis reaction of the above-mentioned amine salt (C) may be any solvent in which the polycarboxylic acid of formula (II) and the amine of formula (III) are soluble, and the reaction product can be easily separated by evaporation. As specific examples, methanol, acetone, 2-propanol, toluene, ethylmethylketone, ethanol, hexane, diethylether, tetrahydrofuran, benzene, and the like may be mentioned.

Arbitrary compounding agents normally used in the relevant technical field, for example, vulcanization promoters such as stearic acid, zinc oxide, and magnesium oxide, vulcanization accelerators, vulcanizing agents, processing aids, antioxidants, and the like, can further be arbitrarily added in normal blended amounts to the rubber composition of the present invention as necessary. As the mixing method used when blending the compounding agents, normal methods can be used and normally, the compounding agents in lump form, pellet form, or powder form can be mixed using a suitable mixer, for example, a kneader, an internal mixer, a Banbury mixer, a roll, or the like. After the rubber composition is prepared by mixing the various compounding agents, a tire tread, for example, can be formed by a normal pressure molding.

EXAMPLES

The present invention is further explained in detail, referring to the below-mentioned examples and comparative examples. However, it goes without saying that the technical scope of the present invention is not limited by these examples.

Analysis Techniques

Amine Salts 1 to 15 used in the below-mentioned examples of the present invention were synthesized as follows. The below-mentioned analysis techniques were used in the identification of Amine Salts 1 to 15.

(1) Nuclear Magnetic Resonance Spectroscopy ($^1$H NMR and $^{13}$C-NMR)

Nuclear Magnetic Resonance Spectroscopy ($^1$H NMR and $^{13}$C-NMR was performed using a nuclear magnetic resonance spectrometer AV400M (400 MHz) made by Bruker and using heavy dimethyl sulfoxide (heavy DMSO) as the solvent.

(2) Elemental Analysis Technique

Elemental analysis was performed using a fully automatic elemental analyzer 2400II made by PerkinElmer. This elemental analyzer determined the quantity of each of the elements carbon, hydrogen, nitrogen, and oxygen by completely burning the sample at a high temperature of 1,800° C. or more in oxygen. The proportion of each of the elements carbon, hydrogen, and nitrogen are represented as % by weight.

Synthesis of Amine Salts 1 to 15
Synthesis of Amine Salt 1

150 mL of acetone was added to a 1 liter round-bottom flask with a cork. Next, 60 g (0.508 mol) of succinic acid and 100.7 g (1.016 mol) of cyclohexylamine were added thereto, and a precipitate formed after reacting for 5 minutes at room temperature. By filtering the precipitate, washing the precipitate remaining on the filter paper twice with acetone, and drying under reduced pressure, 159.1 g (yield: 99%) of a powdered white product was obtained. This product had a melting point of 199.3° C. when measured by differential scanning calorimetry (DSC). This product was analyzed by the above-mentioned nuclear magnetic resonance spectroscopy ($^1$H-NMR and $^{13}$C-NMR) and elemental analysis technique, and thus identified as the amine salt (hereinafter referred to as "Amine Salt 1") represented by the following structural formula.

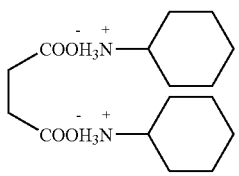

¹H- and ¹³C-NMR Measurement Results:

¹H-NMR spectrum (400 MHz, heavy DMSO) chemical shift δ (ppm): 1.0-1.3, 1.6, 1.8, 2.0, 2.4, 2.9

¹³C-NMR spectrum (400 MHz, heavy DMSO) chemical shift δ (ppm): 24.1, 24.6, 31.0, 33.9, 49.9, 180.3

Elemental Analysis Results:

Calculated values: C, 60.73; H, 10.19; N, 8.85.

Measured values: C, 61.06; H, 10.53; N, 9.29.

Synthesis of Amine Salt 2

150 mL of acetone was added to a 1 liter round-bottom flask with a cork. Next, 60 g (0.517 mol) of maleic acid and 102.4 g (1.03 mol) of cyclohexylamine were added thereto, and a precipate formed after reacting for 5 minutes at room temperature. By filtering the precipitate, washing the precipitate remaining on the filter paper twice with acetone, and drying under reduced pressure, 159.3 g (yield: 98%) of a powdered white product was obtained. This product had a melting point of 138° C. when measured by DSC. This product was analyzed by ¹H-NMR and ¹³C-NMR and the elemental analysis technique, and thus identified as the amine salt (hereinafter referred to as "Amine Salt 2") represented by the following structural formula.

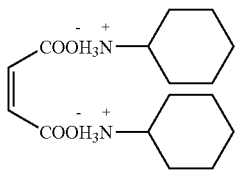

¹H- and ¹³C-NMR Measurement Results:

¹H-NMR spectrum (400 MHz, heavy DMSO) chemical shift δ (ppm): 1.0-1.3, 1.5, 1.7, 1.8, 2.7, 6.0

¹³C-NMR spectrum (400 MHz, heavy DMSO) chemical shift δ (ppm): 24.1, 24.9, 33.2, 49.6, 136.1, 167.2

Elemental Analysis Results:

Calculated values: C, 61.12; H, 9.62; N, 8.91.

Measured values: C, 61.02; H, 9.85; N, 8.78.

Synthesis of Amine Salt 3

150 mL of acetone was added to a 1 liter round-bottom flask with a cork. Next, 30 g (0.180 mol) of phthalic acid and 37.6 g (0.379 mol) of cyclohexylamine was added thereto, and a precipate formed after reacting for 5 minutes at room temperature. By filtering the precipitate, washing the precipitate remaining on the filter paper twice with acetone, and drying under reduced pressure, 64.5 g (yield: 98%) of a powder white product was obtained. This product had a melting point of 132° C. when measured by DSC. This product was analyzed by ¹H- and ¹³C-NMR and the elemental analysis technique, and thus identified as the amine salt (hereinafter referred to as "Amine Salt 3") represented by the following structural formula.

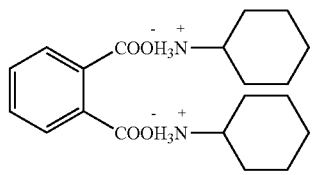

¹H- and ¹³C-NMR Measurement Results:

¹H-NMR spectrum (400 MHz, heavy DMSO) chemical shift δ (ppm): 1.0-1.3, 1.5, 1.7, 1.8, 2.8, 7.5, 8.2

¹³C-NMR spectrum (400 MHz, heavy DMSO) chemical shift δ (ppm): 24.1, 24.9, 32.3, 49.6, 130.2, 132.5, 135.0

Elemental Analysis Results:

Calculated values: C, 65.91; H, 8.85; N, 7.69.

Measured values: C, 63.07; H, 9.20; N, 7.21.

Synthesis Amine Salt 4

150 mL of acetone was added to a 1 liter round-bottom flask with a cork. Next, 30 g (0.205 mol) of adipic acid and 41.7 g (0.42 mol) of cyclohexylamine were added thereto, and a precipate formed after reacting for 5 minutes at room temperature. By filtering the precipitate, washing the precipitate remaining on the filter paper twice with acetone, and drying under reduced pressure, 70 g (yield: 99%) of a powdered white product was obtained. This product had a melting point of 164.5° C. when measured by DSC. This product was analyzed by ¹H- and ¹³C-NMR and the elemental analysis technique, and thus identified as the amine salt (hereinafter referred to as "Amine Salt 4") represented by the following structural formula.

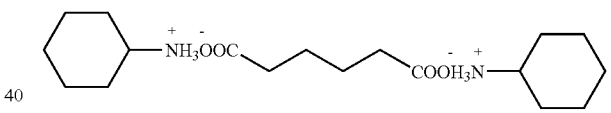

¹H- and ¹³C-NMR Measurement Results:

¹H-NMR spectrum (400 MHz, heavy DMSO) chemical shift δ (ppm): 1.0-1.3, 1.5, 1.6, 1.8, 1.9, 2.1, 2.8

¹³C-NMR spectrum (400 MHz, heavy DMSO) chemical shift δ (ppm): 23.9, 24.4, 24.7, 31.0, 34.2, 34.2, 49.0, 174.8

Elemental Analysis Results:

Calculated values: C, 62.76; H, 10.53; N, 8.13.

Measured values: C, 61.21; H, 9.54; N, 8.33.

Synthesis of Amine Salt 5

150 mL of acetone was added to a 1 liter round-bottom flask with a cork. Next, 40 g (0.254 mol) of succinic acid and 55.7 mL (0.534 mol) of tert-butylamine was added thereto, and a precipate formed after reacting for 5 minutes at room temperature. By filtering the precipitate, washing the precipitate remaining on the filter paper twice with acetone, and drying under reduced pressure, 86.9 g (yield: 97%) of a powdered white product was obtained. This product had a melting point of 192.2° C. when measured by DSC. This product was analyzed by ¹H- and ¹³C-NMR and the elemental analysis technique, and thus identified as the amine salt (hereinafter referred to as "Amine Salt 5") represented by the following structural formula.

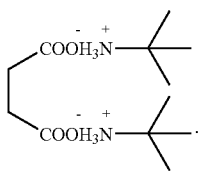

¹H- and ¹³C-NMR Measurement Results:
¹H-NMR spectrum (400 MHz, heavy DMSO) chemical shift δ (ppm): 1.2, 2.2
¹³C-NMR spectrum (400 MHz, heavy DMSO) chemical shift δ (ppm): 28.4, 32.8, 49.9, 175.4
Elemental Analysis Results:
Calculated values: C, 54.52; H, 10.68; N, 10.60.
Measured values: C, 53.22; H, 9.62; N, 10.47.

Synthesis of Amine Salt 6

150 mL of acetone was added to a 1 liter round-bottom flask with a cork. Next, 60 g (0.447 mol) of malic acid and 88.7 g (0.894 mol) of cyclohexylamine was added thereto, and a precipate formed after reacting for 5 minutes at room temperature. By filtering the precipitate, washing the precipitate remaining on the filter paper twice with acetone, and drying under reduced pressure, 147.0 g (yield: 99%) of a powdered white product was obtained. This product had a melting point of 149.9° C. when measured by DSC. This product was analyzed by ¹H- and ¹³C-NMR and the elemental analysis technique, and thus identified as the hydroxy acid amine salt (hereinafter referred to as "Amine Salt 6") represented by the following structural formula.

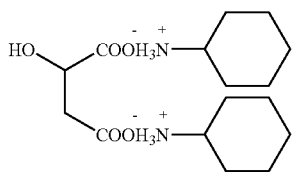

¹H- and ¹³C-NMR Measurement Results:
¹H-NMR spectrum (400 MHz, heavy DMSO) chemical shift δ (ppm): 1.0-1.3, 1.6, 1.7, 1.8, 2.3, 2.5, 2.7, 3.8
¹³C-NMR spectrum (400 MHz, heavy DMSO) chemical shift δ (ppm): 24.1, 24.9, 33.3, 42.2, 49.6, 175.0, 176.2
Elemental Analysis Results:
Measured values: C, 57.97; H, 10.00; N, 8.39.
Calculated values: C, 57.81; H, 9.70; N, 8.43.

Synthesis of Amine Salt 7

300 mL of acetone was added to a 1 liter round-bottom flask with a cork. Next, 42 g (0.28 mol) of tartaric acid and 55.5 g (0.56 mol) of cyclohexylamine was added thereto, and a precipate formed after reacting for 10 minutes at room temperature. By filtering the precipitate, washing the precipitate remaining on the filter paper twice with acetone, and drying under reduced pressure, 95.6 (yield: 98%) of a powder white product was obtained. This product had a melting point of 157.71° C. when measured by DSC. This product was analyzed by H- and ¹³C-NMR and the elemental analysis technique, and thus identified as the hydroxy acid amine salt (hereinafter referred to as "Amine Salt 7") represented by the following structural formula.

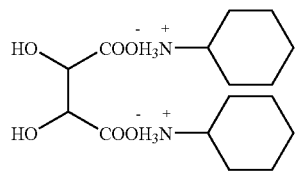

¹H- and ¹³C-NMR Measurement Results:
¹H-NMR spectrum (400 MHz, heavy DMSO) chemical shift δ (ppm): 1.0-1.2, 1.6, 1.7, 1.9, 2.9, 3.8
¹³C-NMR spectrum (400 MHz, heavy DMSO) chemical shift δ (ppm): 23.7, 24.5, 30.4, 49.2, 71.2, 174.3
Elemental Analysis Results:
Measured values: C, 55.05; H, 9.02; N, 8.21.
Calculated values: C, 55.15; H, 9.26; N, 8.04.

Synthesis of Amine Salt 8

150 mL of acetone was added to a 1 liter round-bottom flask with a cork. Next, 40 g (0.298 mol) of malic acid and 65.4 mL (0.597 mol) of tert-butylamine were added thereto, and a precipitate formed after reacting for 5 minutes at room temperature. By filtering the precipitate, washing the precipitate remaining on the filter paper twice with acetone, and drying under reduced pressure, 82.7 g (yield: 99%) of a powder white product was obtained. This product had a melting point of 197.27° C. when measured by DSC. This product was analyzed by ¹H- and ¹³C-NMR and the elemental analysis technique, and thus identified as the hydroxy acid amine salt (hereinafter referred to as "Amine Salt 8") represented by the following structural formula.

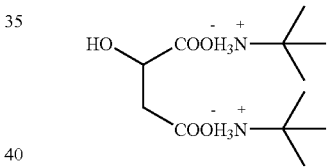

¹H- and ¹³C-NMR Measurement Results:
¹³H-NMR spectrum (400 MHz, heavy DMSO) chemical shift δ (ppm): 1.3, 2.1, 2.2, 2.6, 4.0
¹³C-NMR spectrum (400 MHz, heavy DMSO) chemical shift δ (ppm): 26.7, 41.7, 50.9, 68.5, 175.6, 177.6
Elemental Analysis Results:
Measured values: C, 49.14; H, 10.07; N, 8.64.
Calculated values: C, 51.41; H, 9.49; N, 9.99.

Synthesis of Amine Salt 9

150 mL of acetone was added to a 1 liter round-bottom flask with a cork. Next, 35 g (0.261 mol) of malic acid and 30.3 g (0.261 mol) of hexamethylene diamine were added thereto, and a precipate formed after reacting for 5 minutes at room temperature. By filtering the precipitate, washing the precipitate remaining on the filter paper twice with acetone, and drying under reduced pressure, 62.7 g (yield: 96%) of a powdered white product was obtained. This product had a melting point of 131.5° C. when measured by DSC. This product was analyzed by ¹H- and ¹³C-NMR and the elemental analysis technique, and thus identified as a salt (hereinafter referred to "Amine Salt 9") formed from hexamethylene diamine and malic acid.

¹H- and ¹³C-NMR Measurement Results:
¹H-NMR spectrum (400 MHz, heavy DMSO) chemical shift δ (ppm): 1.3, 1.6, 2.1, 2.4, 2.8, 4.0

$^{13}$C-NMR spectrum (400 MHz, heavy DMSO) chemical shift δ (ppm): 24.8, 26.2, 39.04, 43.2, 69.9, 170.2, 176.4

Elemental Analysis Results:
Measured values: C, 46.28; H, 9.28; N, 11.26.
Calculated values: C, 47.99; H, 8.86; N, 11.19

Synthesis of Amine Salt 10

150 mL of acetone was added to a 1 liter round-bottom flask with a cork. Next, 20 g (0.104 mol) of citric acid and 31.5 g (0.318 mol) of cyclohexylamine were added thereto, and a precipitate formed after reacting for 10 minutes at room temperature. By filtering the precipitate, washing the precipitate remaining on the filter paper twice with acetone, and drying under reduced pressure, 46.6 g (yield: 97%) of a powdered white product was obtained. This product had a melting point of 199.91° C. when measured by DSC. This product was analyzed by the $^1$H- and $^{13}$C-NMR and the elemental analysis technique, and thus identified as the hydroxy acid amine salt (hereinafter referred to as "Amine Salt 10") represented by the following structural formula.

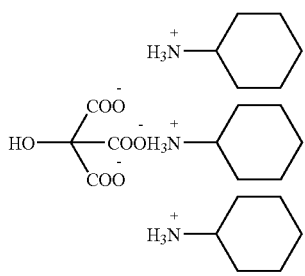

$^1$H- and $^{13}$C-NMR Measurement Results:
$^1$H-NMR spectrum (400 MHz, heavy DMSO) chemical shift δ (ppm): 1.0-1.3, 1.6-1.9, 2.4, 2.9
$^{13}$C-NMR spectrum (400 MHz, heavy DMSO) chemical shift δ (ppm): 24.1, 24.9, 33.3, 42.2, 49.6, 74.4, 170.1, 173.2

Elemental Analysis Results:
Measured values: C, 55.36; H, 9.20; N, 7.42.
Calculated values: C, 57.24; H, 9.39; N, 9.10.

Synthesis of Amine Salt 11

1,000 g of ethanol was added to a 5 liter round-bottom flask with a cork. Next, 121.2 g (1 mol) of 2-phenylethylamine and 59.05 g (0.5 mol) of succinic acid were added thereto, and a precipate formed after reacting for 30 minutes at room temperature. By filtering the precipitate, washing the precipitate remaining on the filter paper twice with acetone, and drying under reduced pressure, 175.7 g (yield: 97.5%) of a powdered white product was obtained. This product had a melting point of 181.3° C. when measured by DSC. This product was analyzed by $^1$H-NMR and thus identified as the hydroxy acid amine salt (hereinafter referred to as "Amine Salt 11") represented by the following structural formula.

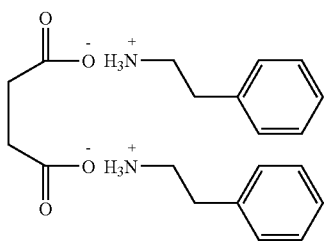

$^1$H-NMR Measurement Results:
$^1$H-NMR spectrum (400 MHz, heavy DMSO) chemical shift δ (ppm): 2.23 (4H, CH$_2$—C=O), 2.75 (4H, CH$_2$-Ph), 2.88 (4H, CH$_2$—N), 7.21, 7.31 (10H, Ph)

Synthesis of Amine Salt 12

1,000 g of ethanol was added to a 5 liter round-bottom flask with a cork. Next, 121.2 g (1 mol) of 2-phenylethylamine and 67.05 g (0.5 mol) of malic acid were added thereto, and a precipate formed after reacting for 30 minutes at room temperature. By filtering the precipitate, washing the precipitate remaining on the filter paper twice with acetone, and drying under reduced pressure, 179.3 g (yield: 95.3%) of a powdered white product was obtained. This product had a melting point of 173.3° C. when measured by DSC. This product was analyzed by 1H-NMR and thus identified as the hydroxy acid amine salt (hereinafter referred to as "Amine Salt 12") represented by the following structural formula.

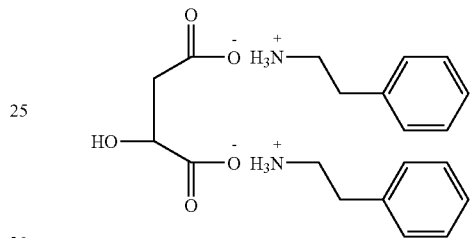

$^1$H-NMR Measurement Results:
$^1$H-NMR spectrum (400 MHz, heavy DMSO) chemical shift δ (ppm): 2.27, 2.51 (2H, CH$_2$—C=O), 2.74 (4H, CH$_2$-Ph), 2.90 (4H, CH$_2$—N), 3.84 (1H, CH—OH), 7.21, 7.32 (10H, Ph)

Synthesis of Amine Salt 13

1,000 g of ethanol was added to a 5 liter round-bottom flask with a cork. Next, 121.2 (1 mol) of 2-phenylethylamine and 75.05 g (0.5 mol) of tartaric acid were added thereto, and a precipate formed after reacting for 30 minutes at room temperature. By filtering the precipitate, washing the precipitate remaining on the filter paper twice with acetone, and drying under reduced pressure, 188.7 g (yield: 96.2%) of a powdered white product was obtained. This product had a melting point of 170.3° C. when measured by DSC. This product was analyzed by'H-NMR and thus identified as the hydroxy acid amine salt (hereinafter referred to as "Amine Salt 13") represented by the following structural formula.

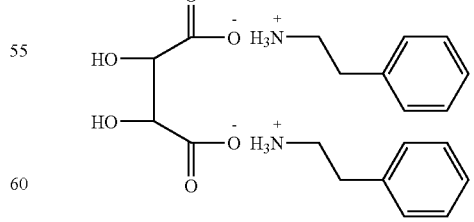

$^1$H-NMR Measurement Results:
$^1$H-NMR spectrum (400 MHz, heavy DMSO) chemical shift δ (ppm): 2.84 (4H, CH$_2$-Ph), 2.97 (4H, CH$_2$—N), 3.85 (2H, CH—OH), 7.25, 7.31 (10H, Ph)

Synthesis of Amine Salt 14 (for Comparison)

150 mL of acetone was added to a 1 liter round-bottom flask with a cork. Next, 44 g (0.499 mol) of propionic acid ($CH_3CH_2COOH$) and 49.5 g (0.499 mol) of cyclohexylamine were added thereto, and after reacting for 5 minutes at room temperature, an amine salt (hereinafter referred to as "Amine Salt 14" of propionic acid and cycloethylamine was formed by isolation similar to Amine Salts 1 to 13. The $^1$H-NMR analysis results are as follows.

$^1$H-NMR Measurement Results:
$^1$H-NMR spectrum (400 MHz, heavy DMSO) chemical shift δ (ppm): 1.16, 1.0-1.3, 1.6-1.9, 2.36, 2.4, 2.9, 11.73

Synthesis of Amine Salt 15 (for Comparison)

150 mL of acetone was added to a 1 liter round-bottom flask with a cork. Next, 60 g (0.201 mol) of ricinoleic acid and 24.3 g (0.211 mol) of cyclohexylamine was added thereto. This was reacted for 10 minutes at room temperature, and the acetone and the unreacted cyclohexylamine were removed by drying under reduced pressure at 45° C. to obtain an amine salt (hereinafter referred to as "Amine Salt 15") of ricinoleic acid and cycloethylamine. The $^1$H-NMR analysis results of Amine Salt 15 are as follows.

$^1$H-NMR Measurement Results:
$^1$H-NMR spectrum (400 MHz, heavy DMSO) chemical shift δ (ppm): 1.0-1.3, 1.31, 1.46, 1.6-1.9, 1.62, 2.21, 2.22, 2.32, 2.4, 2.9, 3.66, 5.39, 5.53, 6.48

Examples 1 to 12 and Comparative Examples 1 to 5

Preparation of Unvulcanized Rubber Compositions

In accordance with the formulations shown in Tables 1 and 2 below (unit: parts by weight), the components other than sulfur and the vulcanization accelerator were mixed for 5 minutes using a 1.7 liter internal Banbury mixer for 5 minutes and discharged from the mixer at 150° C. After this, the sulfur and the vulcanization accelerator were mixed therein for 3 minutes using a roll to obtain the unvulcanized rubber compositions of Examples 1 to 12 and Comparative Examples 1 to 5. The amine salt blended into the unvulcanized rubber compositions of Examples 1, 2, and 7 was Amine Salt 1, the amine salts blended into the unvulcanized rubber compositions of Examples 3 to 6 were Amine Salts 2 to 5 respectively, and the amine salts blended into the unvulcanized rubber compositions of Examples 8 to 12 were Amine Salts 6 to 10 respectively.

TABLE 1

|  | Comparative Example 1 | Comparative Example 2 | Comparative Example 3 | Example 1 | Example 2 | Example 3 | Example 4 | Example 5 | Example 6 |
|---|---|---|---|---|---|---|---|---|---|
| SBR[1] | 80.00 | 80.00 | 80.00 | 80.00 | 80.00 | 80.00 | 80.00 | 80.00 | 80.00 |
| BR[2] | 20.00 | 20.00 | — | — | 20.00 | 20.00 | 20.00 | 20.00 | 20.00 |
| NR[3] | — | — | 20.00 | 20.00 | — | — | — | — | — |
| Amine salt | — | 1.00 | — | 1.00 | 1.00 | 1.00 | 1.00 | 1.00 | 1.00 |
| Silica[4] | 65.00 | 65.00 | 65.00 | 65.00 | 65.00 | 65.00 | 65.00 | 65.00 | 65.00 |
| Silane coupling agent[5] | 5.00 | 5.00 | — | 5.00 | 5.00 | 5.00 | 5.00 | 5.00 | 5.00 |
| Sulfur[6] | 2.00 | 2.00 | 2.00 | 2.00 | 2.00 | 2.00 | 2.00 | 2.00 | 2.00 |
| Vulcanization accelerator[7] | 2.00 | 2.00 | 2.00 | 2.00 | 2.00 | 2.00 | 2.00 | 2.00 | 2.00 |
| Zinc oxide[8] | 3.00 | 3.00 | 3.00 | 3.00 | 3.00 | 3.00 | 3.00 | 3.00 | 3.00 |
| Stearic acid[9] | 2.00 | 2.00 | 2.00 | 2.00 | 2.00 | 2.00 | 2.00 | 2.00 | 2.00 |
| Mooney viscosity ML 5UP | 60.9 | 63.9 | 62.9 | 62.2 | 58.2 | 59.3 | 60.6 | 58.6 | 55.0 |
|  | 38 | 38 | 36.2 | 43.2 | >45 | >45 | 42 | >45 | >45 |
| T95 | 17.4 | 15.9 | 18.3 | 14.2 | 14.8 | 16.3 | 13.3 | 16.5 | 17.5 |
| M100 | 2.0 | 2.1 | 1.9 | 2.9 | 2.2 | 2.4 | 2.4 | 2.2 | 2.4 |
| $T_B$ | 19 | 17 | 18.5 | 16.8 | 18 | 16.6 | 18.6 | 17.9 | 18.3 |
| $E_B$ | 602 | 481 | 600 | 380 | 543 | 472 | 501 | 520 | 490 |
| tan δ (60° C.) | 0.16 | 0.15 | 0.16 | 0.13 | 0.13 | 0.14 | 0.14 | 0.14 | 0.13 |
| ΔG' (index) | 100 | 94 | 100 | 81 | 69 | 79 | 88 | 87 | 73 |

Footnotes of Table 1:
[1]HP752 (styrene-butadiene copolymer rubber) made by JSR Corporation
[2]Nipol BR 1220 (butadiene rubber) made by Zeon Corporation
[3]TSR20 (natural rubber)
[4]AEROSIL R202 made by Nippon Aerosil Co., Ltd.
[5]Si69 (bis-(3-triethoxysilylpropyl)tetrasulfide) made by Degussa Corporation
[6]Powdered sulfur made by Karuizawa Seirensho
[7]Sanceler CM-G made by Sanshin Chemical Industry Co., Ltd.
[8]Zinc Oxide #3 made by Seido Chemical Industry Co., Ltd.
[9]Industrial stearic acid made by Chiba Fatty Acid Co., Ltd.

TABLE 2

|  | Comparative Example 4 | Comparative Example 7 | Comparative Example 5 | Example 8 | Example 9 | Example 10 | Example 11 | Example 12 |
|---|---|---|---|---|---|---|---|---|
| SBR[10] | 75.00 | 75.00 | 80.00 | 75.00 | 75.00 | 75.00 | 75.00 | 75.00 |
| BR[11] | 15.00 | 15.00 | 20.00 | 15.00 | 15.00 | 15.00 | 15.00 | 15.00 |
| NR[12] | 10.00 | 10.00 | — | 10.00 | 10.00 | 10.00 | 10.00 | 10.00 |
| Amine salt | — | 1.00 | 1.00 | 1.00 | 1.00 | 1.00 | 1.00 | 1.00 |
| Silica[13] | 60.00 | 60.00 | — | 60.00 | 60.00 | 60.00 | 60.00 | 60.00 |

TABLE 2-continued

| | Comparative Example 4 | Comparative Example 7 | Comparative Example 5 | Example 8 | Example 9 | Example 10 | Example 11 | Example 12 |
|---|---|---|---|---|---|---|---|---|
| Silane coupling agent[14] | 5.00 | 5.00 | 5.00 | 5.00 | 5.00 | 5.00 | 5.00 | 5.00 |
| Sulfur[15] | 2.00 | 2.00 | 2.00 | 2.00 | 2.00 | 2.00 | 2.00 | 2.00 |
| Vulcanization accelerator[16] | 2.00 | 2.00 | 2.00 | 2.00 | 2.00 | 2.00 | 2.00 | 2.00 |
| Zinc oxide[17] | 3.00 | 3.00 | 3.00 | 3.00 | 3.00 | 3.00 | 3.00 | 3.00 |
| Stearic acid[18] | 2.00 | 2.00 | 2.00 | 2.00 | 2.00 | 2.00 | 2.00 | 2.00 |
| Mooney viscosity | 65.1 | 63.4 | 62.3 | 59.0 | 62.3 | 61.6 | 63.3 | 62.0 |
| ML 5UP | 42.8 | >45 | 40.5 | >45 | 43.9 | >45 | 43 | 42.9 |
| T95 | 16.3 | 15.1 | 13.7 | 13.9 | 12.3 | 15.0 | 14.8 | 13.0 |
| M100 | 2.2 | 2.2 | 2.2 | 2.4 | 2.5 | 2.3 | 2.3 | 2.5 |
| $T_B$ | 21.4 | 19.3 | 16.8 | 18.8 | 17.7 | 19.7 | 18.2 | 18.7 |
| $E_B$ | 617 | 540 | 477 | 509 | 469 | 543 | 504 | 488 |
| tan δ (60° C.) | 0.16 | 0.14 | 0.13 | 0.12 | 0.12 | 0.13 | 0.12 | 0.12 |
| ΔG' (index) | 100 | 98 | 99 | 80 | 77 | 84 | 80 | 87 |

Footnotes of Table 2:
[10]Nipol SBR 1502 (styrene-butadiene copolymer rubber) made by Zeon Corporation
[11]Nipol BR 1220 (butadiene rubber) made by Zeon Corporation
[12]TSR20 (natural rubber)
[13]AEROSIL R202 made by Nippon Aerosil Co., Ltd.
[14]Si69 made by Degussa Corporation
[15]Powdered sulfur of Karuizawa Seirensho
[16]Sanceler CM-G made by Sanshin Chemical Industry Co., Ltd.
[17]Zinc Oxide #3 made by Seido Chemical Industry Co., Ltd.
[18]Industrial stearic acid made by Chiba Fatty Acid Co., Ltd.

The unvulcanized rubber compositions of Examples 1 to 12 and Comparative Examples 1 to 5 obtained as above were evaluated using the following test methods. The tests results are as shown in Tables 1 and 2.

Test Methods (1) Mooney Viscosity

The Mooney viscosity ML(1+4) 100° C. was determined in accordance with JIS K6300 using an L-type rotor.

(2) Mooney Scorch Time

The Mooney viscosity ML was continuously measured in accordance with JIS K6300-1994 using an L-type rotor under the conditions of a preheating time of 1 minute and a test temperature of 125° C. The minimum value of the Mooney viscosity was made $V_m$ and the Mooney scorch time (ML 5UP) (minutes) until the Mooney viscosity increased 5 points from $V_m$ was determined. The Mooney scorch time is an indicator of scorching (rubber scorching), with longer times being better. ">45" for "ML 5UP" means that that the measurement of Mooney viscosity was stopped at 45 minutes.

(3) Vulcanization Speed

In accordance with JIS K6300 (vulcanization test with an oscillating vulcanization tester), the change in viscosity over time at a temperature of 160° C. and an amplitude angle of 1 degree was recorded as a torque-time curve (vulcanization curve) with torque (load) as the vertical axis and vulcanization time (minutes) as the horizontal axis, and this curve was analyzed to determined the time (T95) (minutes) until 95% of the maximum torque value was reached. The larger the numerical value of T95, the longer the vulcanization time is (that is, the vulcanization speed is slower), showing superiority with respect to workability.

(4) Tensility Test

Each sample of the unvulcanized rubber compositions of Examples 1 to 12 and Comparative Examples 1 to 5 was press vulcanized at 160° C. for 30 minutes to obtain a vulcanized rubber sheet having a length of 15 cm, a width of 15 cm, and a thickness of 2 mm. A JIS No. 3 dumbbell-shaped test piece was punched from this vulcanized rubber sheet. Next, in accordance with JIS K6251, the modulus (M100) (MPa) at 100% elongation, the break stress ($T_B$) (MPa) and the elongation at break ($E_B$) (%) were determined.

(5) Loss Tangent (Tan δ (60° C.)

Each sample of the unvulcanized rubber compositions of Examples 1 to 12 and Comparative Examples 1 to 5 was press vulcanized at 160° C. for 30 minutes to obtain a vulcanized rubber sheet having a length of 15 cm, a width of 15 cm, and a thickness of 2 mm. A test piece was prepared from this vulcanized rubber sheet and, in accordance with JIS K6394, the tan δ under the conditions of a temperature of 60° C., a frequency of 20 Hz, and an elongation deformation strain rate of 10%±2% was determined using a viscoelastic spectrometer made by Iwamoto Seisakusho. The smaller the value, the better the reduced heat build-up, showing, in other words, less rolling resistance.

(6) Payne Effect

Each sample of the unvulcanized rubber compositions of Examples 1 to 12 and Comparative Examples 1 to 5 was press vulcanized at 160° C. for 30 minutes to obtain a vulcanized rubber sheet having a length of 15 cm, a width of 15 cm, and a thickness of 2 mm. A test piece was prepared from this vulcanized rubber sheet. The strain shear elastic modulus G' (0.28%) (kPa) and (100%) (kPa) at strains of 0.28% and 100% were measured using a viscoelastic spectrometer made by Toyo Seiki Seisaku-sho, Ltd. at a temperature of 110° C. and a frequency of 6 cpm, and the difference between G'(0.28) and G'(100%), that is, ΔG'=G'(0.28)−G'(100%), was calculated. The values ΔG' are indicated by indices where the value of ΔG' of Comparative Example 1 is 100. The smaller this index value, the better the dispersibility of the silica.

From Tables 1 and 2, it is understood that workability, vulcanization efficiency, reduced heat build-up, mechanical strength, and silica dispersibility are improved when the amine salts of the present invention are blended in the silica-containing rubber compositions.

Standard Examples 1 to 3, Examples 13 to 30, and Comparative Examples 7 to 11

Preparation of Unvulcanized Rubber Compositions

In accordance with the standard formulation shown below (unit: parts by weight), the components other than sulfur and the vulcanization accelerator were mixed using a 1.5 liter internal Banbury mixer for 6 minutes and discharged from the mixer when 150° C. was reached to obtain a master batch. The vulcanization accelerator and the sulfur were mixed into the master batch by an open roll to obtain an unvulcanized rubber composition. Amine salts 11 to 13 blended into the unvulcanized rubber compositions of Examples 13 to 30 were synthesized using phenyethylamine as the amine component. The obtained unvulcanized rubber compositions were evaluated using the following test methods. The test results are as shown in Tables 3 to 5.

Standard Formulation

| | |
|---|---|
| SBR*[1]: | 103.1 parts by weight |
| BR*[2]: | 25 parts by weight |
| Silica*[3]: | 80 parts by weight |
| Silane coupling agent*[4]: | 6.4 parts by weight |
| Oil*[5]: | 4.3 parts by weight |
| Zinc oxide*[6]: | 2.5 parts by weight |
| Stearic acid*[7] | 2.5 parts by weight |
| Sulfur*[8]: | 1.4 parts by weight |
| Vulcanization accelerator CBS*[9]: | 1.7 parts by weight |
| Vulcanization accelerator DPG*[9]: | 2.0 parts by weight |

*[1]VSL-5025 HM-1 made by LANXCESS (37.5 phr oil-extended product)
*[2]Nippol BR 1220 made by Zeon Corporation
*[3]Zeosil 1165MP made by Rhodia
*[4]Si69 made by Degussa Corporation
*[5]Process X-140 made by Japan Energy Corporation
*[6]Zinc Oxide #3 made by Seido Chemical Industry Co., Ltd.
*[7]Beads stearic acid YR made by NOF Corporation
*[8]5% oil-treated sulfur made by Hosoi Chemical Industry Co., Ltd.
*[9]Made by Flexsys B.V.
*[10]Made by Flexsys B.V.

Next, similar to Examples 1 to 12 and Comparative Examples 1 to 5, the Mooney scorch time (ML5UP), the vulcanization speed (T95), tan δ (60° C.), and ΔG' of the obtained unvulcanized rubber composition were determined. With respect to Standard Examples 1 to 3, Examples 13 to 20, and Comparative Examples 7 to 11, other than changing the measurement temperature to −10° C., tan δ (−10° C.) was also determined by the same method as tan δ (60° C.). The smaller the value of tan δ (−10° C.), the better the wet performance. The test results are shown in Tables 3 to 5 below. In Tables 3 to 5, "NP" means that the amine salt was introduced to the mixer in the first mixing step and "FN" means that the amine salt was added to the master batch on the roll together with the sulfur and the vulcanization accelerator.

TABLE 3

| | Standard Example 1 | Example 13 | Example 14 | Example 15 | Example 16 | Example 17 | Comparative Example 6 | Example 18 | Comparative Example 7 |
|---|---|---|---|---|---|---|---|---|---|
| Amine salt 11 (parts by weight) | — | 0.50 | 1.00 | 2.00 | 4.00 | 8.00 | 0.05 | 12.00 | 2.00 |
| Introduction step | — | NP | NP | NP | NP | NP | NP | NP | FN |
| ML5UP | 24.5 | 24.2 | 23.8 | 22.1 | 20.5 | 20 | 24.8 | 18.3 | 21.5 |
| T95 | 19.6 | 18.5 | 17.42 | 16.34 | 14.28 | 11.6 | 19.1 | 10.5 | 15.8 |
| tan δ (−10° C.) | 0.627 | 0.658 | 0.652 | 0.645 | 0.639 | 0.639 | 0.627 | 0.633 | 0.645 |
| tan δ (60° C.) | 0.213 | 0.211 | 0.209 | 0.203 | 0.198 | 0.207 | 0.215 | 0.218 | 0.218 |
| ΔG' (index) | 100 | 93 | 89 | 85 | 82 | 81 | 99 | 80 | 103 |

TABLE 4

| | Standard Example 2 | Example 19 | Example 20 | Example 21 | Example 22 | Example 23 | Comparative Example 8 | Example 24 | Comparative Example 9 |
|---|---|---|---|---|---|---|---|---|---|
| Amine Salt 12 (parts by weight) | — | 0.50 | 1.00 | 2.00 | 4.00 | 8.00 | 0.05 | 12.00 | 2.00 |
| Introduction step | — | NP | NP | NP | NP | NP | NP | NP | FN |
| ML5UP | 24.5 | 24 | 23.1 | 20.5 | 19.1 | 18.4 | 24.6 | 17.1 | 19.7 |
| T95 | 19.55 | 18 | 17.1 | 15.54 | 13.53 | 13.91 | 18.9 | 12.1 | 14.48 |
| tan δ (−10° C.) | 0.627 | 0.677 | 0.664 | 0.658 | 0.652 | 0.645 | 0.627 | 0.633 | 0.652 |
| tan δ (60° C.) | 0.213 | 0.211 | 0.211 | 0.205 | 0.201 | 0.209 | 0.218 | 0.220 | 0.220 |
| ΔG' (index) | 100 | 94 | 90 | 86 | 83 | 82 | 101 | 81 | 103 |

TABLE 5

| | Standard Example 3 | Example 25 | Example 26 | Example 27 | Example 28 | Example 29 | Comparative Example 10 | Example 30 | Comparative Example 11 |
|---|---|---|---|---|---|---|---|---|---|
| Amine Salt 13 (parts by weight) | — | 0.50 | 1.00 | 2.00 | 4.00 | 8.00 | 0.05 | 12.00 | 2.00 |
| Introduction step | — | NP | NP | NP | NP | NP | NP | NP | FN |
| ML5UP | 24.5 | 23.5 | 22.1 | 21.1 | 19.8 | 18.2 | 24.6 | 17.1 | 20.1 |
| T95 | 19.6 | 17.5 | 16.2 | 13.4 | 11.3 | 12.1 | 18.6 | 11.5 | 12.9 |
| tan δ (−10° C.) | 0.627 | 0.683 | 0.677 | 0.664 | 0.658 | 0.658 | 0.627 | 0.639 | 0.645 |
| tan δ (60° C.) | 0.213 | 0.213 | 0.211 | 0.205 | 0.201 | 0.209 | 0.218 | 0.220 | 0.220 |
| ΔG' (index) | 100 | 95 | 92 | 86 | 84 | 82 | 102 | 81 | 104 |

From Tables 3 and 5, it is understood that particularly silica dispersibility is improved with the carboxylic acid amine salt of the present invention synthesized using phenylethylamine as the amine component blended into the silica-containing rubber composition in the first mixing step (that is, the silanization reaction step). This is considered to be because of acceleration of the reaction between the silica and the coupling agent by the carboxylic acid amine salt of the present invention.

INDUSTRIAL APPLICABILITY

When a carboxylic acid amine salt of the present invention is added to a silica-containing rubber, since workability, mechanical strength, rolling resistance, and wet resistance of a rubber composition are improved, it is useful as a rubber composition for tire caps.

What is claimed is:

1. A rubber composition for a pneumatic tire, prepared in a plurality of mixing steps, comprising:
    (I) a first mixing step of preparing a mixture by mixing:
        (A) natural rubber, butadiene rubber, styrene-butadiene copolymer rubber, or a mixture thereof;
        (B) 50 to 120 parts by weight, per 100 parts by weight of the component (A), of silica;
        (C) 0.2 to 20 parts by weight, per 100 parts by weight of the component (A), of an amine salt represented by the following general formula (I):

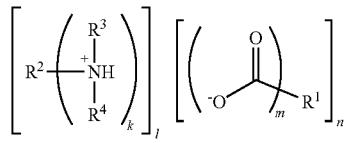

wherein $R^1$ represents a saturated or unsaturated organic group of 1 to 12 carbons not having a hydroxyl group, or a saturated or unsaturated organic group of 1 to 12 carbons having 1 or more hydroxyl groups; $R^2$, $R^3$, and $R^4$ each independently represent a hydrogen atom, a saturated or unsaturated chain hydrocarbon group of 1 to 12 carbons, a saturated or unsaturated alicyclic hydrocarbon group of 3 to 12 carbons, an aromatic hydrocarbon group of 6 to 18 carbons, or a heterocyclic group of 5 to 18 ring atoms and 2 or more carbons or at least two of $R^2$, $R^3$, and $R^4$ join together with the nitrogen atoms to which they are bonded to form a heterocyclic group of 5 to 18 ring atoms and 2 or more carbons, k, l, and n are each integers of 1 or more, and m is an integer of 2 or more, with a proviso that k, l, m, and n satisfy a relational expression k×l=m×n=2 or more; and
    (D) 1 to 20% by weight, based on the component (B), of (D) a silane coupling agent and additives other than sulfur and vulcanization acceleration agents; and
    (II) a second mixing step of mixing sulfur and a vulcanization acceleration agent with the mixture obtained in the first mixing step;
wherein a strain shear elastic modulus difference ΔG' between strain shear elastic modulus G' strains of 0.28% and 100%, $\Delta G'=G'_{0.28\%}-G'_{100\%}$, at a temperature of 110° C. is 90 or less.

2. The rubber composition according to claim 1, wherein the number of carbons of $R^1$ in general formula (I) for the amine salt (C) is 2.

3. A pneumatic tire comprising the rubber composition according to claim 1.

4. The rubber composition according to claim 1, wherein $R^1$ represents a saturated or unsaturated chain hydrocarbon group of 2 to 4 carbons.

5. The rubber composition according to claim 1, wherein at least one of the $R^1$, $R^2$, $R^3$, or $R^4$ saturated or unsaturated chain hydrocarbon groups of 1 to 12 carbons comprises a straight chain.

6. The rubber composition according to claim 1, wherein at least one of the $R^1$, $R^2$, $R^3$, or $R^4$ saturated or unsaturated chain hydrocarbon groups of 1 to 12 carbons comprises a branched chain.

7. The rubber composition according to claim 1, wherein at least one of the $R^2$, $R^3$, and $R^4$ saturated or unsaturated groups of 1 to 12 carbons comprises a saturated or unsaturated alicyclic hydrocarbon group of 6 carbons.

8. The rubber composition according to claim 1, wherein at least one of the $R^2$, $R^3$, and $R^4$ saturated or unsaturated groups of 1 to 12 carbons comprises an aromatic hydrocarbon group of 6 to 8 carbons.

9. The rubber composition according to claim 1, wherein k=1, l=2, m=2, and n=1.

10. The rubber composition according to claim 1, wherein k=1, l=3, m=3, and n=1.

11. The rubber composition according to claim 1, wherein component (C) comprises 0.5 to 8 parts by weight, per 100 parts by weight of the component (A).

12. The rubber composition according to claim 1, wherein component (B) comprises 60 to 100 parts by weight, per 100 parts by weight of the component (A).

13. The rubber composition according to claim 1, wherein the inorganic filler of component (B) is formed from one of anhydrous silicic acid and hydrous silicic acid.

14. The rubber composition according to claim 1, wherein the natural rubber, butadiene rubber, styrene-butadiene copolymer rubber, or the mixture thereof comprises a mixture of styrene-butadiene copolymer rubber and butadiene rubber at a ratio of greater than 4:1.

15. The rubber composition according to claim 1, wherein the vulcanization acceleration agent comprises a plurality of vulcanization accelerator agents including n-cyclohexyl-2-benzothiazolesulfenamide (CBS) and diphenyl guanidine (DPG), wherein the rubber composition includes a greater amount of DPG than CBS.

16. The rubber composition according to claim 1, further comprising oil, zinc oxide, stearic acid, and sulfur, and wherein the rubber composition includes a substantially similar amount of zinc oxide as stearic acid, a greater amount of oil than either the zinc oxide or the stearic acid, and a lesser amount of sulfur than the zinc oxide or the stearic acid.

17. The rubber composition according to claim 1, wherein the amine salt is a carboxylic acid amine salt synthesized using phenylethylamine as the amine component blended into the silica-containing rubber composition in the first mixing step.

18. The rubber composition according to claim 1, wherein the rubber composition has a tan δ (60° C.) of 0.211 or less and a tan δ (−10° C.) of 0.683 or less and greater than 0.652.

19. The rubber composition according to claim 1, wherein the rubber composition comprises a Mooney viscosity of 59.0 or less.

* * * * *